US012115750B2

(12) United States Patent
Ericson

(10) Patent No.: US 12,115,750 B2
(45) Date of Patent: Oct. 15, 2024

(54) PACKAGE BLANK NORMALIZING SYSTEM

(71) Applicant: Delkor Systems, Inc., St. Paul, MN (US)

(72) Inventor: Jeremiah Ericson, Andover, MN (US)

(73) Assignee: Delkor Systems, Inc., St. Paul, MN (US)

( * ) Notice: Subject to any disclaimer, the term of this patent is extended or adjusted under 35 U.S.C. 154(b) by 0 days.

(21) Appl. No.: 18/181,654

(22) Filed: Mar. 10, 2023

(65) Prior Publication Data

US 2024/0300201 A1 Sep. 12, 2024

(51) Int. Cl.

*B31B 50/02* (2017.01)
*B31B 50/00* (2017.01)
*B31B 50/04* (2017.01)
*B31B 50/06* (2017.01)
*B31B 50/44* (2017.01)
*B31B 50/62* (2017.01)

(52) U.S. Cl.

CPC .......... *B31B 50/022* (2017.08); *B31B 50/005* (2017.08); *B31B 50/006* (2017.08); *B31B 50/044* (2017.08); *B31B 50/066* (2017.08); *B31B 50/44* (2017.08); *B31B 50/62* (2017.08)

(58) Field of Classification Search

CPC .................... B65B 41/04; B65B 41/18; B31B 50/042–046; B31B 50/06; B31B 50/066; B31B 50/022; B31B 50/064; B31B 50/07; B65H 9/002; B65G 47/244; B65G 47/2445; B65G 2203/042

See application file for complete search history.

(56) References Cited

U.S. PATENT DOCUMENTS 3,603,446 A * 9/1971 Maxey ................. B65G 47/244 271/227
4,490,129 A * 12/1984 Oakley .................... B65D 5/28 493/134
5,169,140 A * 12/1992 Wenthe, Jr. ............ B65H 9/002 271/227
5,172,907 A * 12/1992 Kalisiak ................. B65H 9/002 271/227
5,375,722 A * 12/1994 Leary ...................... B31B 50/00 250/559.46
5,678,159 A * 10/1997 Williams ........... G03G 15/6567 271/236

(Continued)

*Primary Examiner* — Joshua G Kotis

(74) *Attorney, Agent, or Firm* — Forsgren Fisher McCalmont DeMarea Tysver LLP; James M. Urzedowski; Daniel A. Tysver

(57) ABSTRACT

A normalizing system for use with a case former, the system's components function and use are provided. Components of the system include a frame that defines a blank magazine area and a case forming area. Case pickers within the blank magazine area are configured to engage and lift a top-most case blank from the magazine. The pickers transfer the blank to left and right clamp assemblies, which grasp respective edges of the blank and then advance the blank toward the case forming area along a linear pathway. Alignment sensors positioned across the pathway detect if the case blank is in alignment as determined by the value of the angle(s) that the leading edge of the blank forms where it intersects each of the alignment sensors. If misalignment is detected, servos which control the rate of advancement of the clamp assemblies, adjust that rate to bring the blank back into alignment.

15 Claims, 19 Drawing Sheets

(56) References Cited

U.S. PATENT DOCUMENTS

| | | | | | |
|---|---|---|---|---|---|
| 6,997,455 | B2 * | 2/2006 | Romine | B65H 9/002 | 271/227 |
| 8,050,616 | B2 * | 11/2011 | Suzuki | G03G 15/6564 | 399/394 |
| 8,256,767 | B2 * | 9/2012 | Williams | B65H 9/002 | 271/227 |
| 10,800,625 | B2 * | 10/2020 | Bhide | B65H 7/08 | |
| 11,192,728 | B2 * | 12/2021 | Abe | B65G 47/91 | |
| 11,685,568 | B2 * | 6/2023 | Wegner | B65B 59/005 | 53/548 |
| 11,866,283 | B2 * | 1/2024 | Holtman | B65H 29/10 | |
| 2007/0048053 | A1 * | 3/2007 | De Jong | B65H 29/20 | 399/394 |
| 2008/0237975 | A1 * | 10/2008 | de Jong | B65H 9/002 | 271/226 |
| 2009/0170678 | A1 * | 7/2009 | Smith | B31B 50/44 | 493/51 |
| 2013/0090221 | A1 * | 4/2013 | Green | B31B 50/28 | 493/162 |
| 2013/0090222 | A1 * | 4/2013 | Green | B31B 50/00 | 493/162 |
| 2014/0371045 | A1 * | 12/2014 | Bruneau | B31B 50/74 | 493/52 |
| 2015/0021226 | A1 * | 1/2015 | Jacomelli | B65D 5/4266 | 206/508 |
| 2015/0191267 | A1 * | 7/2015 | Mochizuki | B65B 9/04 | 53/373.2 |
| 2017/0217611 | A1 * | 8/2017 | Cappi | B65B 11/12 | |
| 2018/0169988 | A1 * | 6/2018 | Somers, III | B31B 50/44 | |
| 2022/0410522 | A1 * | 12/2022 | Rodot | B31B 50/44 | |

* cited by examiner

PACKAGE BLANK NORMALIZING SYSTEM

FIELD OF THE INVENTION

The present invention relates generally to case former and more specifically to a transfer and loading system (referred to herein as a "normalizing system") for delivering case blanks from a blank delivery system magazine to the case former in a continuous, uninterrupted manner, while ensuring that the case blanks are maintained in a properly aligned manner during transfer from the delivery system to the former, and if a blank being transferred does become misaligned, the normalizing system detects and corrects such misalignment automatically and without the need to interrupt any aspect of the loading, transferring, and forming cycle.

BACKGROUND OF THE INVENTION

With most known case forming machines (formers), the former relies on a blank delivery system, which includes a reservoir or magazine of case blanks that are drawn or advanced into the former on an individual basis, whereupon the former forms the blank into a box, tray, case, etc., which is loaded with a product or products. An example of such a case blank delivery system is shown and described in U.S. application Ser. No. 17/716,854, filed on Apr. 8, 2022 and entitled Continuous Case Blank Delivery System, the entire contents of which is incorporated herein by reference.

Known formers may include a mechanism to assist in delivering individual case blanks from the blank delivery system to the package formation area where the case blank is folded, glued or otherwise assembled into a packaging case. When transferring case blanks from the delivery system and into the former it is important that the transfer be a rapid and uniform process so that the package assembly is as efficient as possible. In many known formers however, the transfer mechanism can become a failure point in the process if a blank becomes misaligned. A misaligned blank may result in a non-uniform package, or worse may end up interfering or getting blocked in the in the former, resulting in the package assembly line having to be shut down, so that the mis-aligned blank can be cleared from the system.

SUMMARY OF THE INVENTION

Embodiments disclosed herein provide for a blank transfer apparatus, system and method of use configured to automatically detect if a blank being transferred from the blank magazine to the package formation area of a former is misaligned, and then automatically corrects such misalignment to ensure that all transferred blanks entering the package formation area are positioned in an optimal manner, so that the former produces packages with uniform characteristics and minimizes the chances of blank transfer being a failure point in the package case assembly process.

Embodiments of the apparatus and system employ a blank shuttle frame having components that are moveable from a position over a magazine or stack of blanks and into a package forming area of a case former. The shuttle frame is equipped with a pair of opposing shuttle clamps, each of which are configured to grip opposing ends of a blank being transferred from a magazine or stack of blanks located in a blank magazine area. Each clamp is moveable independent of the shuttle frame and driven by a respective servo motor(servo).

Via alignment sensors, embodiments of the apparatus and system are configured to recognize when a blank is misaligned within the shuttle. As a blank is being transferred from the blank magazine area to the case forming area the blank will pass through/across each alignment sensor. Depending on when the leading edge of the blank is detected by each sensor the system determines if the blank is misaligned relative to a line of operation defined by the physical orientation of the combined sensors. Such a misalignment will result in a positive offset at one end of the blank and a negative offset at the other end of the blank. Upon detecting the misalignment the system will speed up and/or slow the servos that actuate the movement of the opposed clamps so as to bring the blank back into alignment with the line of operation.

Embodiments of the apparatus and system described herein utilize blank pickers to initially pick up and separate the blank to be transferred from the magazine or stack of blanks. Once the pickers have lifted a blank from the magazine, the opposed shuttle clamps move in to grip the opposed ends of the blank. Once clamped into place, the pickers release the blank. The opposed shuttle clamps then pull back in opposite directions, resulting in the blank being placed under tension so as to eliminate any warp in the blank. Once tensioned, the shuttle clamps advance the blank through the line of operation of the alignment sensors and into the case forming area.

Embodiments of the apparatus and system described herein include one or more glue or adhesive applicators or guns. As the blank is advanced into the case forming area, one or more glue guns apply glue to the blank in accordance with a predetermined pattern. By ensuring that the blank is properly aligned within the system when glue is applied the system automatically ensures that glue is applied in the correct locations on the blank surface with consistency.

Embodiments of the apparatus and system described herein include a case forming head in the case forming area. The case forming head is moveable in a vertical direction perpendicular to the plane of the blank that is being held and transported by the shuttle clamps. After glue has been applied to the blank, the shuttle clamps advance the blank into the blank forming area, whereupon the case forming head vertically descends to contact the blank and thereafter push the blank into a case forming cavity. When the case forming head contacts the blank, the system causes the shuttle clamps to release the blank. Upon releasing the blank, the shuttle clamps return to the blank magazine area to start the blank transferring process anew.

A more complete description of the embodiments disclosed herein, as well as their individual components, function and advantages are shown in the following drawings and described in the detailed description below.

DETAILED DESCRIPTION

As mentioned above, embodiments disclosed herein provide for a blank transfer apparatus, system and method of use that is utilized as a component(s) of a case former. Aspects of the blank transfer apparatus and system are shown in FIGS. 1-20, with its features, components and method of use described in detail below.

Figure 1:
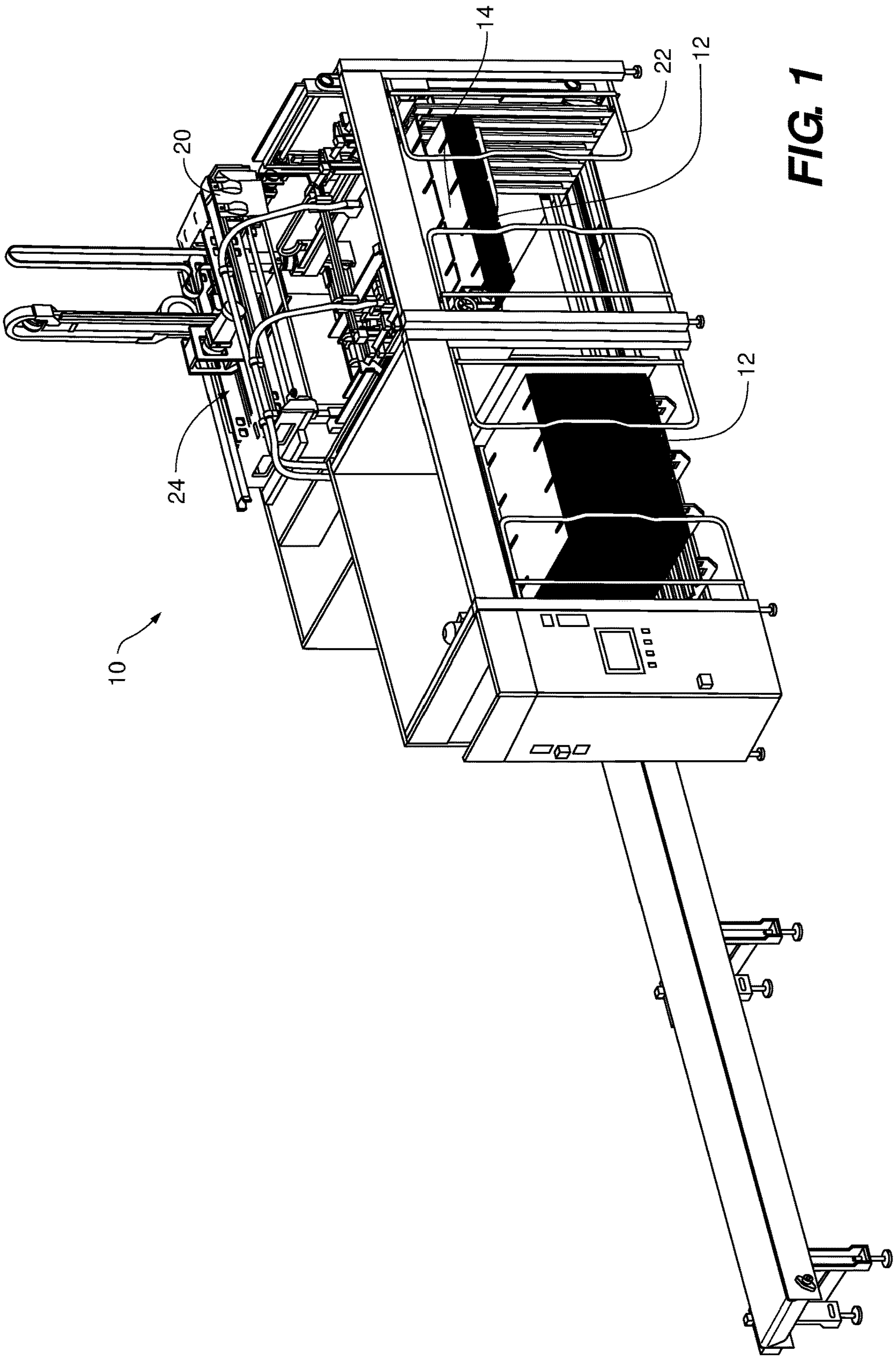
FIG. 1 is a perspective view of a case former incorporating an embodiment of the blank transfer apparatus and system.
Figure 2:
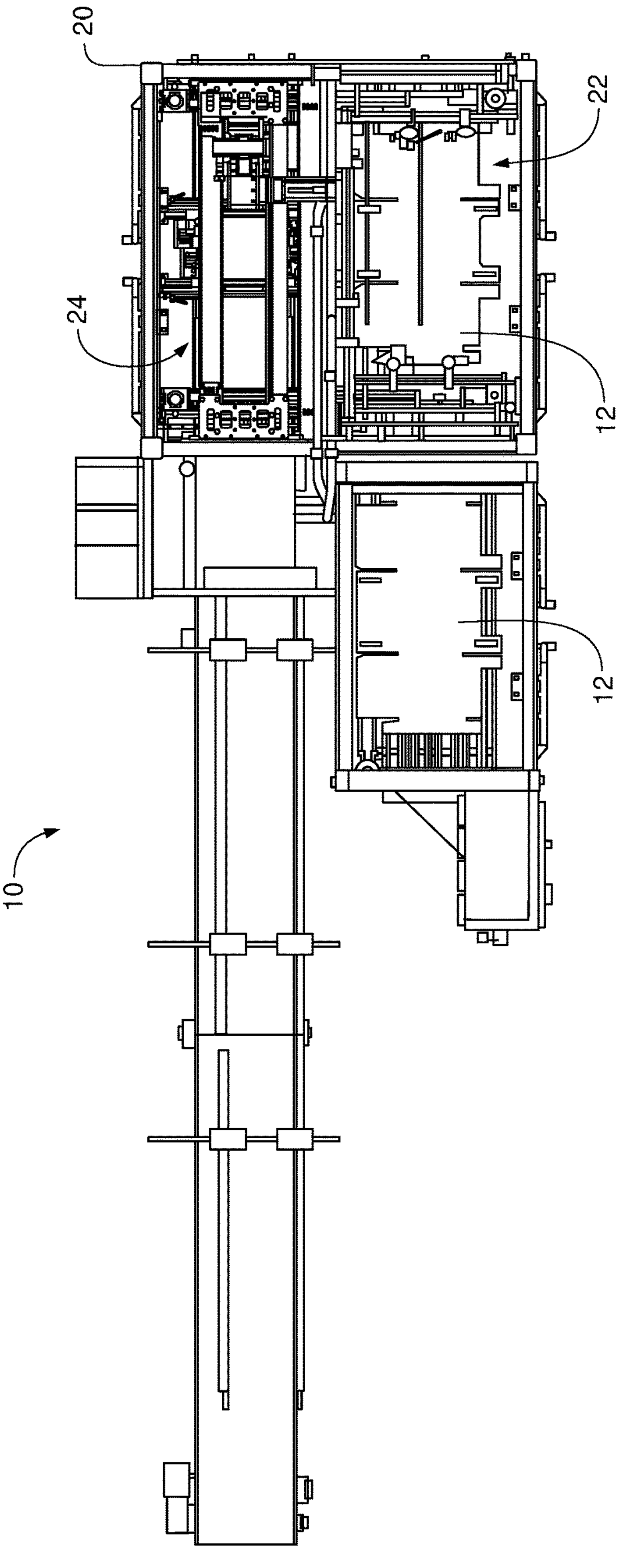
FIG. 2 is a top down view of the case former shown in FIG. 1.
Figure 3:
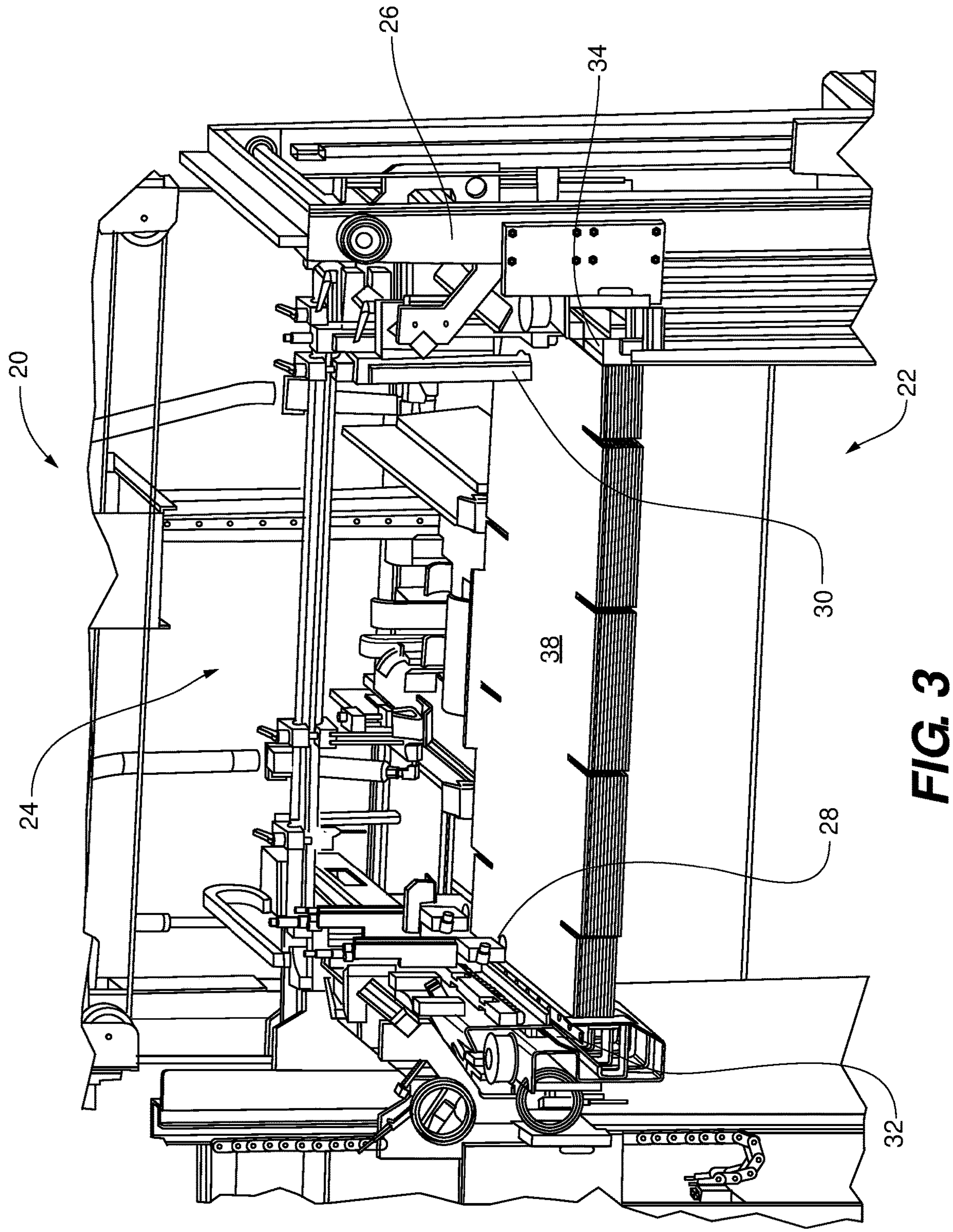
FIG. 3 is a front perspective view showing the blank magazine area of the case former shown in FIGS. 1-2.

A case former 10, such as is shown in FIGS. 1-2 has several components and elements. Of note, the former 10 includes one or more case blank magazines 12, of which each are comprised of some number of case blanks 14 that are individually processed through the former 10 where they are formed into packages such as shipping containers and/or retail ready displays 16 (see FIGS. 20-21). A case blank magazine 12 is loaded into the former 10 and is lifted up into range of a case blank transfer system 20 (the system).

The system 20, may be considered to have two primary components or areas, namely a blank magazine area 22 and a case forming area 24. Areas 22 and 24 are defined by a housing or frame 26 that supports left and right blank pickers 28 and 30 and left and right shuttle clamp assemblies 32 and 34, shown in FIG. 3. The blank pickers 28 and 30, and the shuttle clamps 32 and 34 are moveable relative to the frame 26 and between the blank magazine area 22 and the case forming area 24, and are configured to engage and manipulate the top-most case blank (or picked blank) 38 of the case blank magazine 12 so as to transfer case blanks from the magazine 12 and into the case forming area 24 in a continuous, repeating and uninterrupted manner as shown in FIGS. 3-20 and described below.

Figure 4:
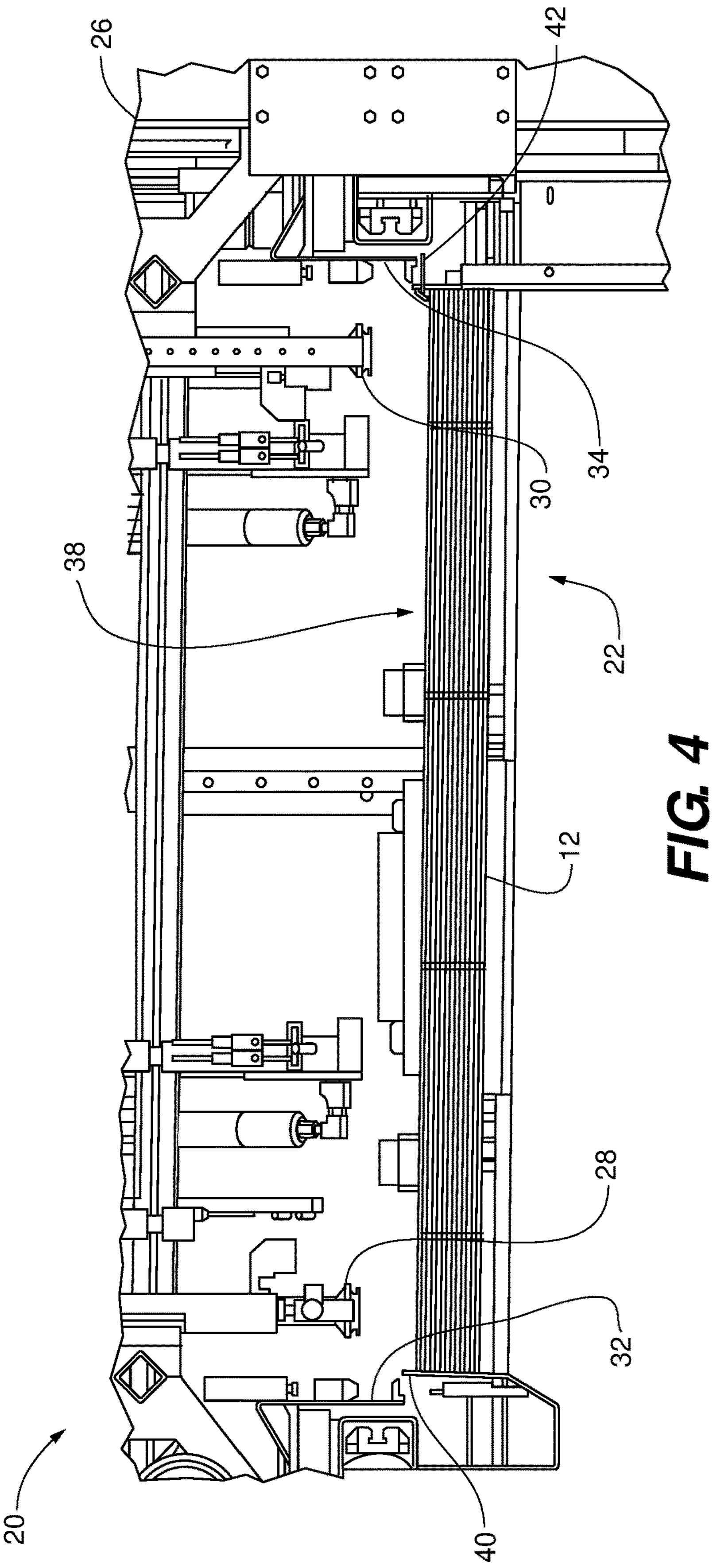
FIG. 4 is a detailed, front view of the blank magazine area shown in FIG. 3, depicted prior to blank pickers descending to pick-up the top-most case blank from the magazine.
Figure 5:
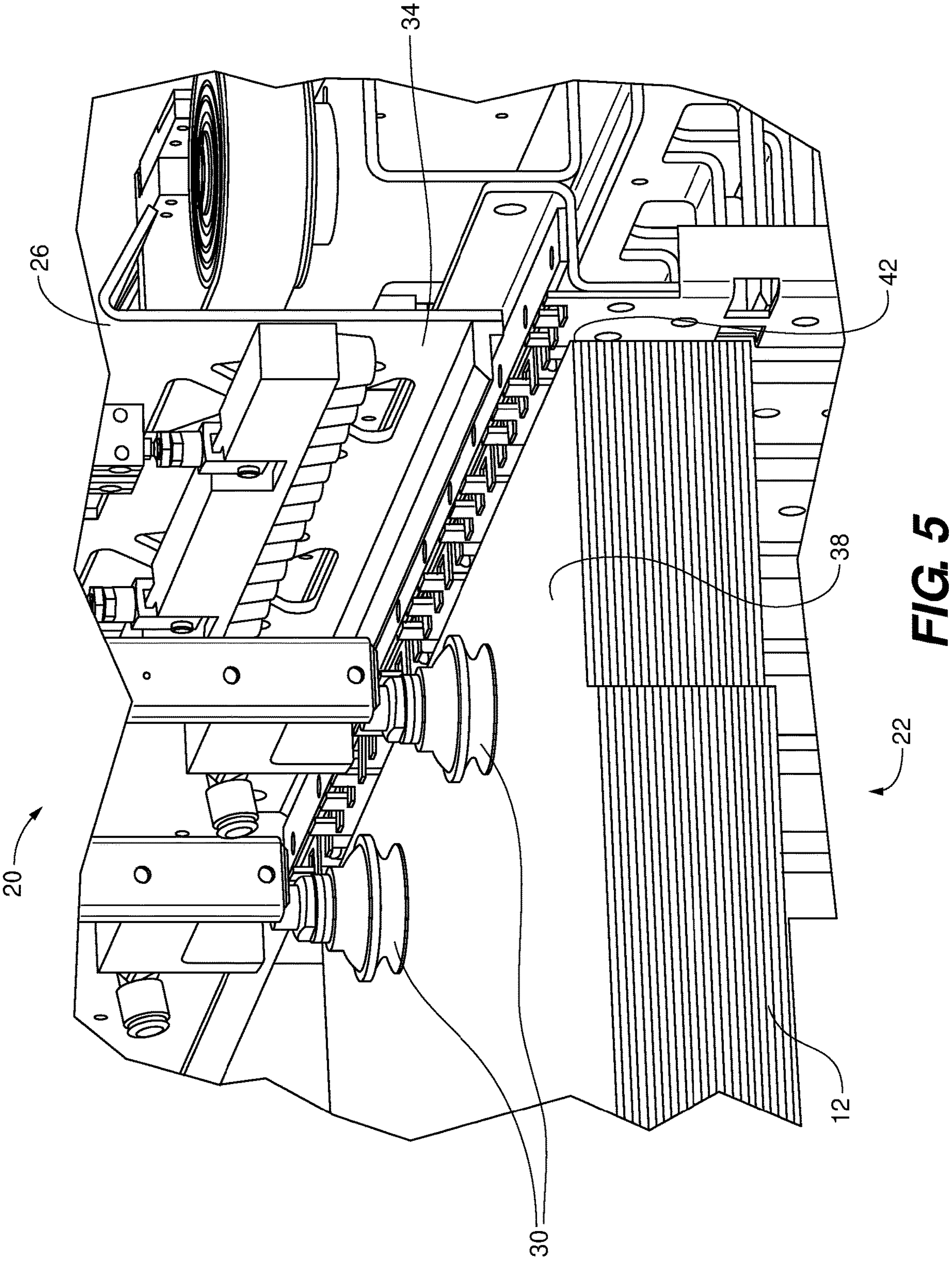
FIG. 5 is a detailed, perspective view of the blank magazine area shown in FIG. 4, depicting the manner in which blank pickers at one end of the blank magazine area engage the top-most blank of the magazine.

When a magazine 12 is positioned into the case blank magazine area 22, the blank pickers 28 and 30 descend from a default position relative to the frame 26, shown in FIG. 4, to contact and engage the top-most case blank 38 (or picked blank) of the magazine 12, in the manner shown in FIG. 5. In at least one embodiments the blank pickers are comprised of two or more left side pickers 28 (shown in FIG. 4) and two or more right side pickers 30. Note: as used herein, right (side) and left (side) are in reference to the relationship of the named components to the picked blank 38, which as shown in at least FIGS. 3, and 10-12, is depicted as having a left side edge 40 and a right side edge 42. In at least one embodiment, the blank pickers 28 and 30 are negative pressure pick-up heads or suction heads which are placed into contact with the picked blank 38 simultaneously, and due to the negative pressure provided by the pickers, the picked blank 38 is pulled against each of the pickers 28 and 30 and held in place. Once thusly engaged to the picked blank 38, the pickers 28 and 30 are retracted vertically away from the magazine 12, thereby lifting the picked blank 38 up and off of the magazine 12 such as in the manner shown in FIG. 6 (picker 28 not shown).

While in some embodiments, the pickers 28 and 30 are configured to move laterally (horizontally) relative to the picked blank 38, and have sufficient suction strength such that some degree of opposite lateral movement by the pickers 28 and 30 minimizes sagging or warping of the picked blank 38, in the embodiment shown however, the system 10 includes shuttle clamp assemblies 32 and 34 to maintain the shape and alignment of the picked blank 38 in the manner described below.

In some embodiments, pickers 28 and 30 are moveably engaged to the frame 26 in the same manner as shuttle clamp assemblies 32 and 34 described below, and are configured to transport the picked blank 38 from the blank magazine area 22 to the case forming area 24.

In the embodiment shown however, the frame 26 supports left and right shuttle clamp assemblies 32 and 34, both of which are shown in FIG. 4 but only the right assembly 34 is shown in the detailed views of FIGS. 6-9 which depict the components of the assemblies and the manner of their functions.

Each of the shuttle clamp assemblies 32 and 34 are comprised of a shelf 44 and a plunger 46. The plunger 46 is vertically moveable between a release position shown in FIGS. 6-7 and an engaged or gripped position shown in FIGS. 8-9, whereby an edge (right side edge 42 as depicted) of the picked blank 38 is gripped between the shelf 44 and plunger 46.

Figure 6:
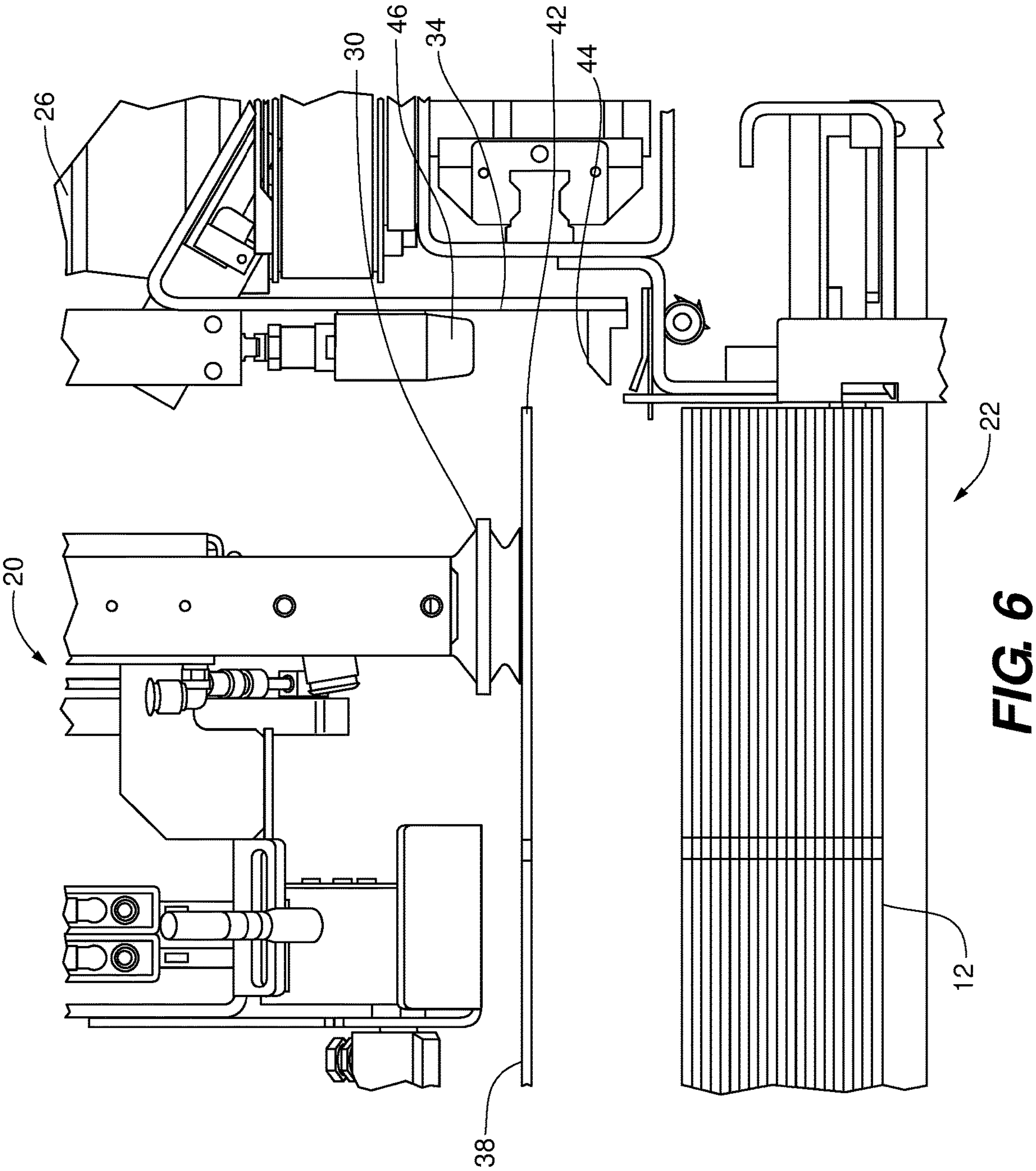
FIG. 6 is a detailed, front view of the blank magazine area shown in FIG. 5, depicting the manner in which blank pickers pick-up the top-most blank from the magazine area.
Figure 7:
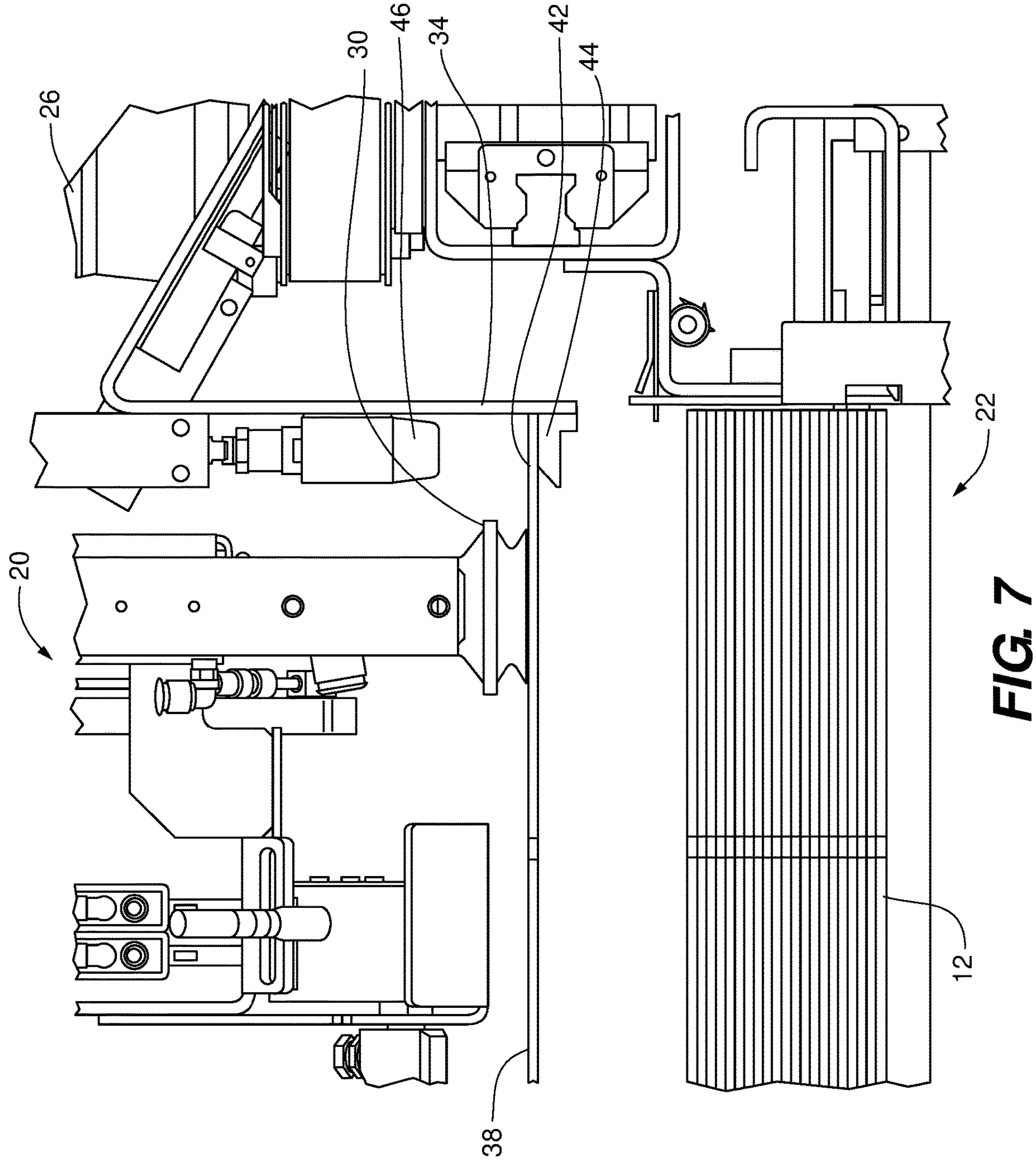
FIG. 7 is a detailed, front view of the blank magazine area shown in FIG. 6, depicting the inward advancement of the shuttle clamp at one end of the picked blank so that the picked blank is supported by the lower member or shelf of the shuttle clamp.

The shuttle clamp assemblies 32 and 34 are moveable relative to the frame 26 and in relation to the picked blank 38. In FIG. 6 the default position of the right shuttle clamp assembly 34 is shown whereby the assembly 34 is positioned laterally adjacent to the right side edge 42 of the picked blank 38. When the pickers 28 and 30 have engaged the picked blank 38 and vertically retract to a position above the magazine 12, the shuttle clamp assemblies 32 and 34 are moved laterally toward the picked blank 38 until the shelf 44 of each shuttle clamp assembly 32 and 34 is positioned under an edge 40 and 42 of the picked blank 38, such as in the manner shown in FIG. 7.

Figure 8:
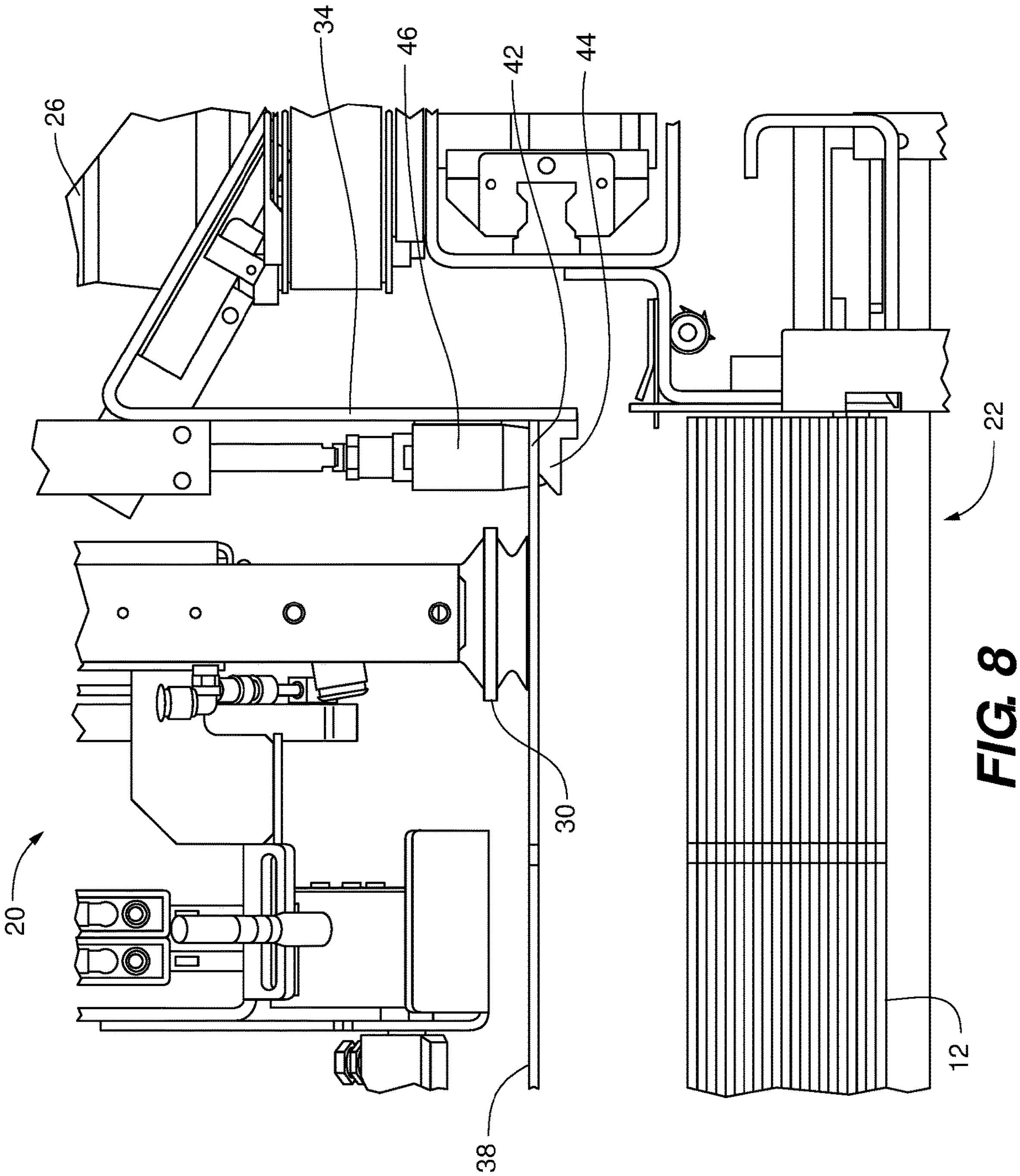
FIG. 8 is a detailed, front view of the blank magazine area shown in FIG. 7, depicting the manner in which the upper member or plunger of the shuttle clamp is actuated to pin an edge of the picked blank between the shelf and plunger of the shuttle clamp.
Figure 9:
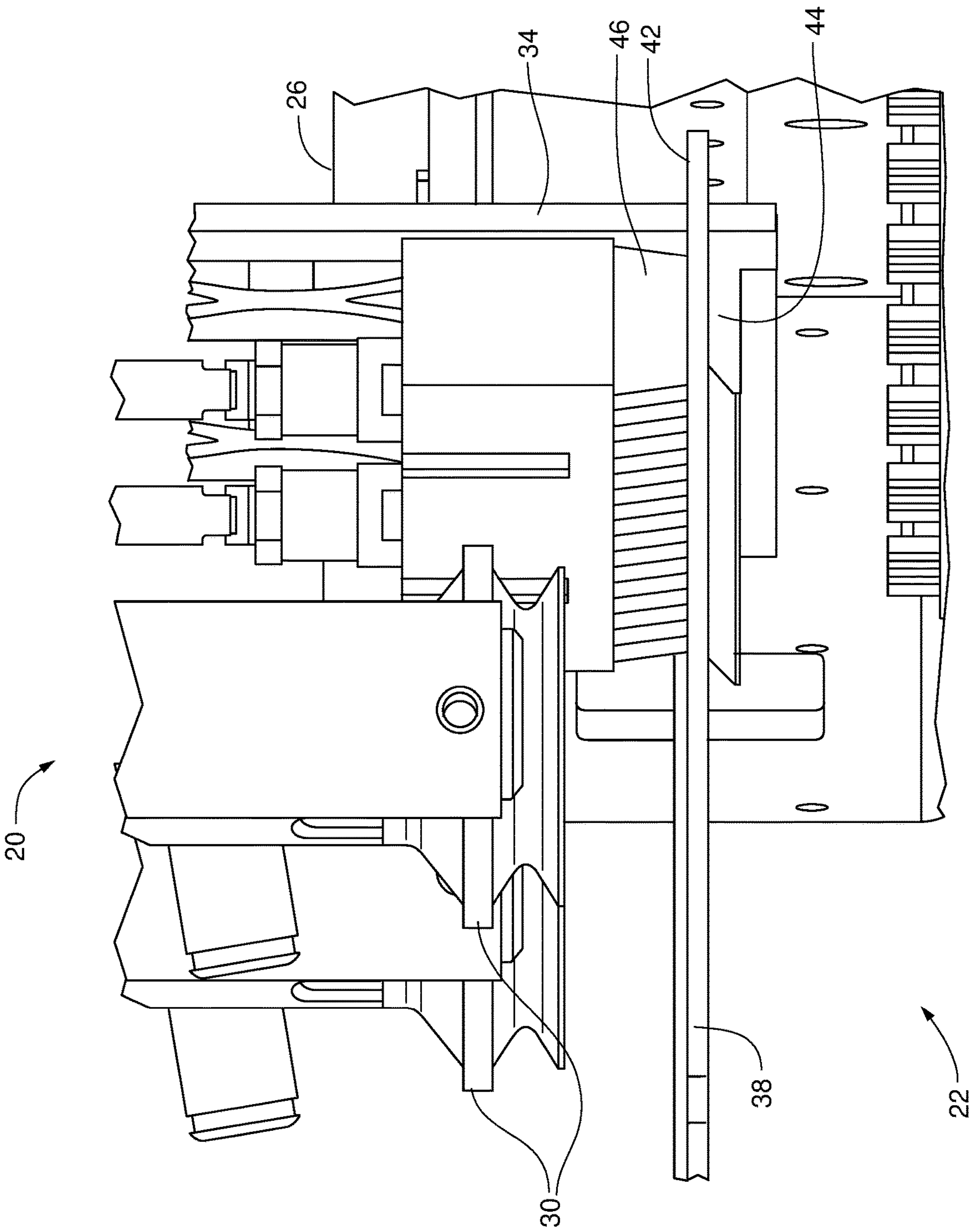
FIG. 9 is a detailed, perspective view of the blank magazine area shown in FIG. 8, wherein the blank pickers are withdrawn from the picked blank due to the blank being held by the shuttle clamps.

Once the blank 38 is supported by each shelf 44, the plunger 46 is actuated to engage the blank 38 from above, in the manner shown in FIG. 8, thereby pinning or gripping the blank 38 between the shelf 44 and the plunger 46. Once the blank is held in this manner, the pickers 28 and 30 release their hold on the picked blank 38, in the manner shown in FIG. 9, and the picked blank 38 is then supported and held only by the shuttle clamp assemblies 32 and 34 along the edges 40 and 42 of the blank.

Once the blank 38 is clamped in place and held by the shuttle clamp assemblies 32 and 34 in the manner described above, the shuttle clamp assemblies 32 and 34 are pulled back laterally toward their default positions in order to apply tension to the blank 38 and thereby minimize or eliminate any warp in the blank 38.

Figure 10:
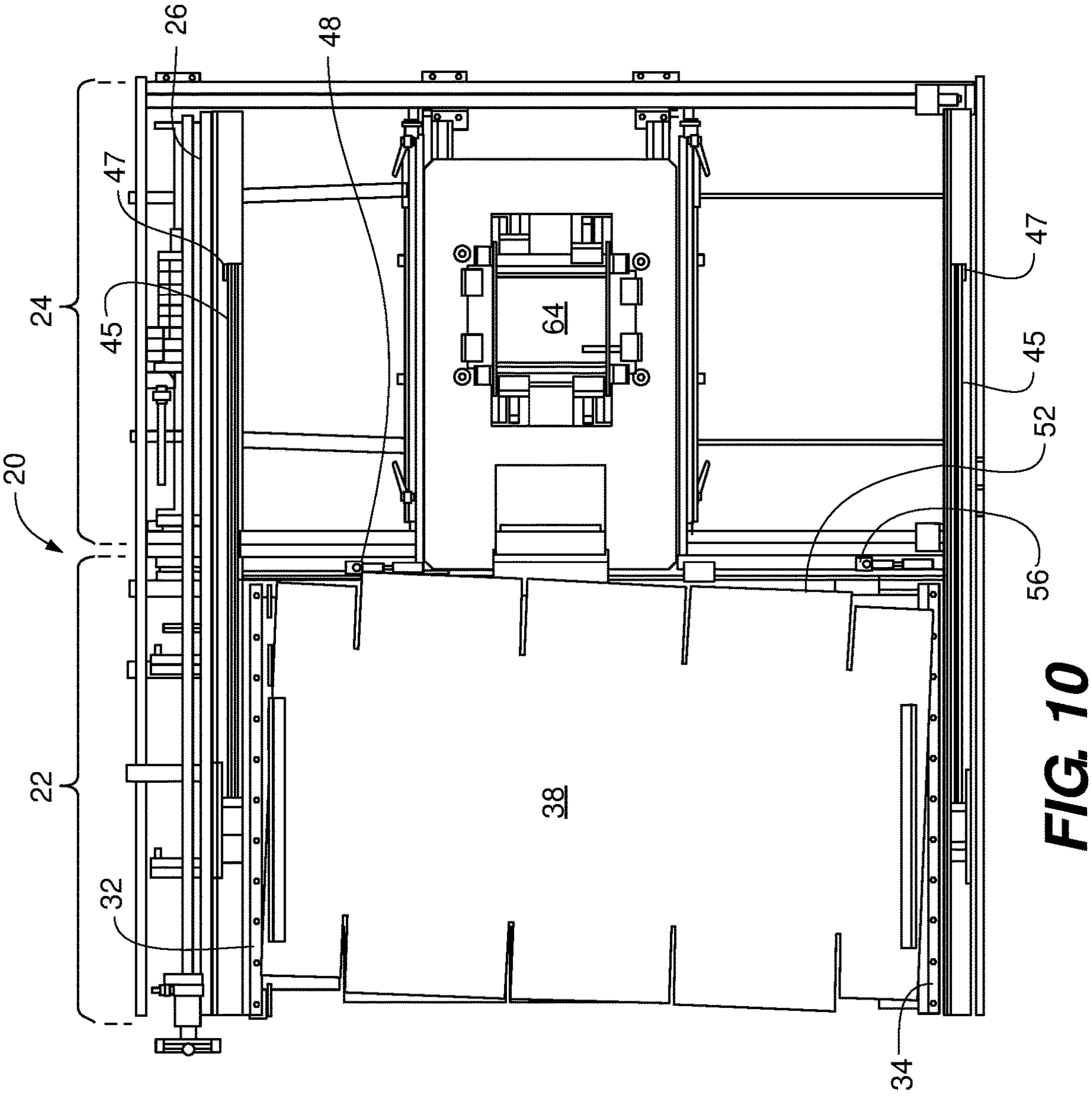
FIG. 10 is a top down view of the blank magazine area and the case forming area of the case former shown in FIGS. 1-9, wherein a picked blank is being advanced through alignment sensors positioned between the blank magazine area and the case forming area.
Figure 11:
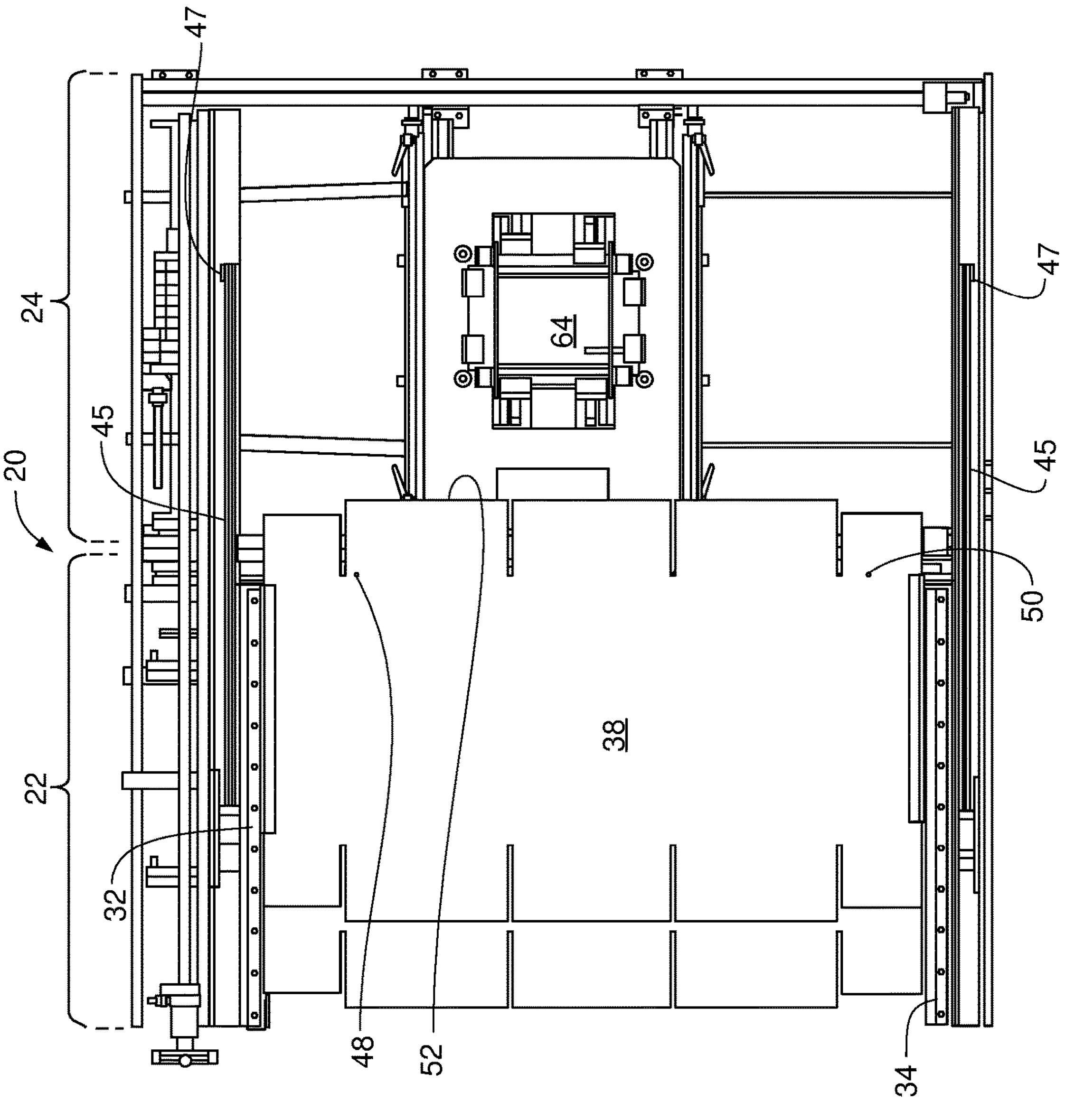
FIG. 11 is a top down view of the blank magazine area and the case forming area of the case former shown in FIGS. 1-9, wherein a picked blank is shown in proper alignment between the shuttle clamps as the system advances the blank from the blank magazine area to the case forming area.
Figure 12:
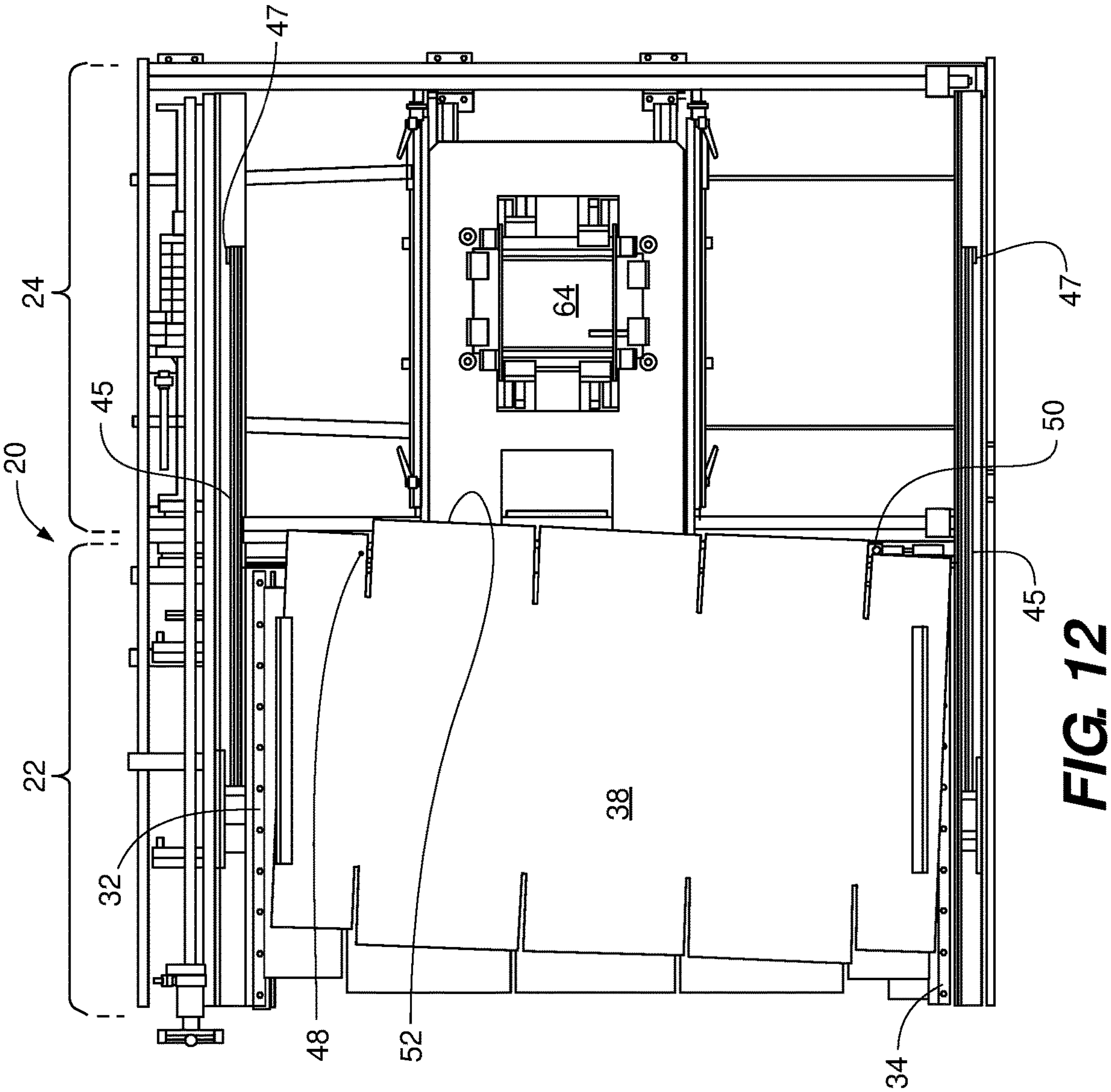
FIG. 12 is a top down view of the blank magazine area and the case forming area of the case former shown in FIG. 10, but wherein the picked blank is shown misaligned between the shuttle clamps.

Turning now to FIGS. 10-12, as mentioned above, the shuttle clamp assemblies 32 and 34 are moveable relative to the frame 26. While their ability to move laterally relative to a picked blank 38 has been described above, the assemblies are also capable of linear movement along the frame 26 between the blank magazine area 22 and the case forming area 24.

The assemblies 32 and 34 may be moveable in this manner by any of a variety of mechanisms such as pneumatic actuators, hydraulics, electrical motors, etc. In the embodiment shown, each of the shuttle clamp assemblies 32 and 34 are moveable via a belt 45, each of which are driven by a servo motor (servo) 47. By actuating the servo 47 in one direction or another the belt 45 can advance either of the shuttle clamp assemblies 32 and 34 in one direction (e.g., toward the case forming area 24) or another direction (e.g., toward the blank magazine area 22). The system 20 is capable of actuating the servos 47, so that each shuttle clamp assembly 32 and 34 is moveable in the same or different directions.

Once a picked blank 38 is engaged by the shuttle clamp assemblies 32 and 34 in the manner described above, the system 20 will default to advancing each of the assemblies 32 and 34, and thus the picked blank 38 held therebetween, from their initial position within the blank magazine area 22 into the case forming area 24 at the same speed.

The system 20 includes first and second alignment sensors 48 and 50 that are spaced apart from one another along a plane positioned between the blank magazine area 22 and the case forming area 24 perpendicular to the direction of traversal of the shuttle clamp assemblies 32 and 34. As the picked blank 38 traverses from the blank magazine area 22 into the case forming area 24, the blank 38 will cross over each of the alignment sensors 48 and 50.

Figure 13:
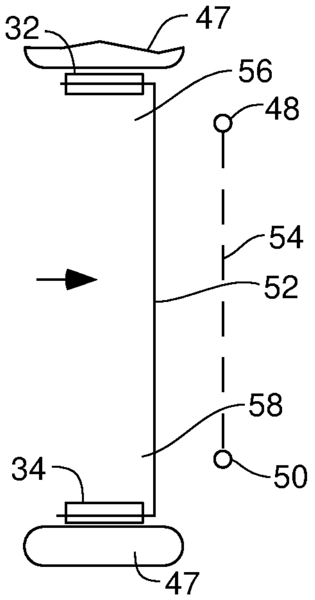
FIGS. 13-14 are a schematic and sequential depiction of the manner in which the alignment sensors of the system detect that a picked blank is in proper alignment between the shuttle clamps.
Figure 14:
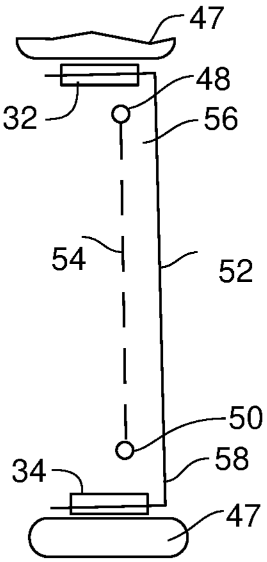

When the picked blank 38 passes over each sensor 48 and 50, if both sensors 48 and 50 detect the passage of the leading edge 52 of the blank 38 at the same time, or within an acceptable interval of time, the blank 38 is in a sufficient degree of alignment between the shuttle clamp assemblies 32 and 34 for the system 20 to continue advancing the blank 38 to continue transfer of the plank into the case forming area 24 without interruption or adjustment, such as in the manner shown in FIG. 13-14.

In at least one embodiment the acceptable time interval is less than one second. In some embodiments the acceptable time interval is between 0.1 to 0.01 seconds.

Figure 15:
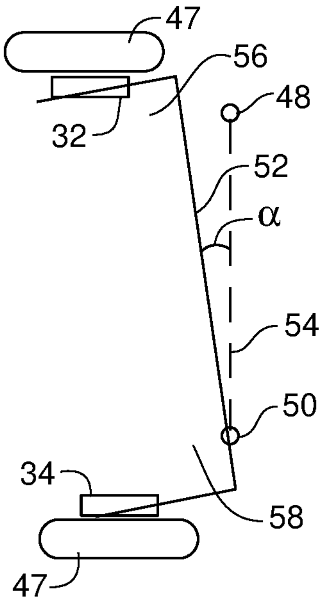
FIGS. 15-17 are a schematic and sequential depiction of the manner in which the alignment sensors of the system detect that a picked blank is misaligned between the shuttle clamps and the manner through which the system corrects the blank's alignment.
Figure 16:
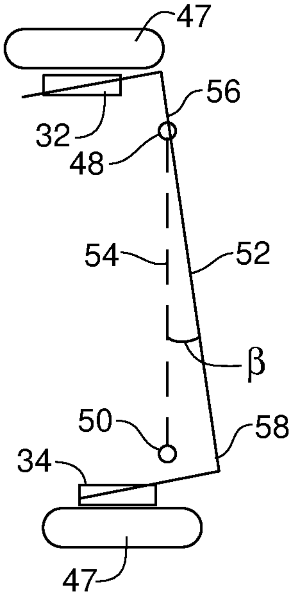
Figure 17:
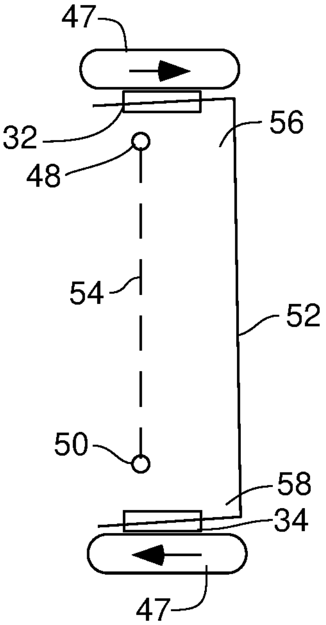

If one of the sensors 48 or 50 detect the passage of the blank's leading edge 52 at a different time (i.e., beyond the acceptable time interval) than the other sensor detects the passage of the leading edge 52, such as in the manner shown in FIG. 12, then one or both sensors 48 and/or 50 communicate with one or both servos 47 to adjust the speed/rate of traversal of one or both shuttle clamp assemblies 32 and 34 to bring the blank 38 into an acceptable alignment in the manner shown in FIGS. 15-17.

In the specific example shown in FIGS. 15-17, the picked blank 38 has a misalignment in regard to both the shuttle clamp assemblies 32 and 34, as well as to the plane 54 defined by the positions of the alignment sensors 48 or 50. Because of this misalignment, as the blank 38 approaches the sensors 48 and 50, a first portion 56 of the leading edge 52 will cross over a first alignment sensor 48, while a second portion 58 of the leading edge 52 will cross over a second alignment sensor 50 at a later point in time. Based on the interval of time between the first sensor 48 and the second sensor 50 detecting the passage of the leading edge 52, the system 20 will recognize the misalignment of the leading edge 52 relative to plane 54 as defined by the angles α and β formed by the intersection of the leading edge 52 and the plane 54 at the respective sensor 48 and 50.

In the example shown in FIGS. 15-17, the system 20, upon determining a misalignment and the degree of the misalignment as defined by angles α and β, will cause the servo 47 that is in control of clamp assembly 32 to speed up and/or cause the servo 47 that is in control of clamp assembly 34 to slow down, in order to bring the blank 38 back in to proper alignment (such that the angles α and β are approximately zero) or the plane 54 and leading edge 52 of the blank 38 are substantially parallel or otherwise within an acceptable angular displacement.

In at least one embodiment, acceptable angular displacement is a displacement between the first and second portions 56 and 58 of the leading edge 52 of no more than 1 inch, or an angle α and/or β of 1 to 3 degrees. In some embodiments, the acceptable angular displacement is an angle α and/or β of no more than 2 degrees.

In this manner the system 20 can detect the manner and degree of any misalignment of a picked blank 38 and correct such misalignment without reducing the overall speed or flow of blanks through the former 10 (see FIGS. 1-2).

Figure 18:
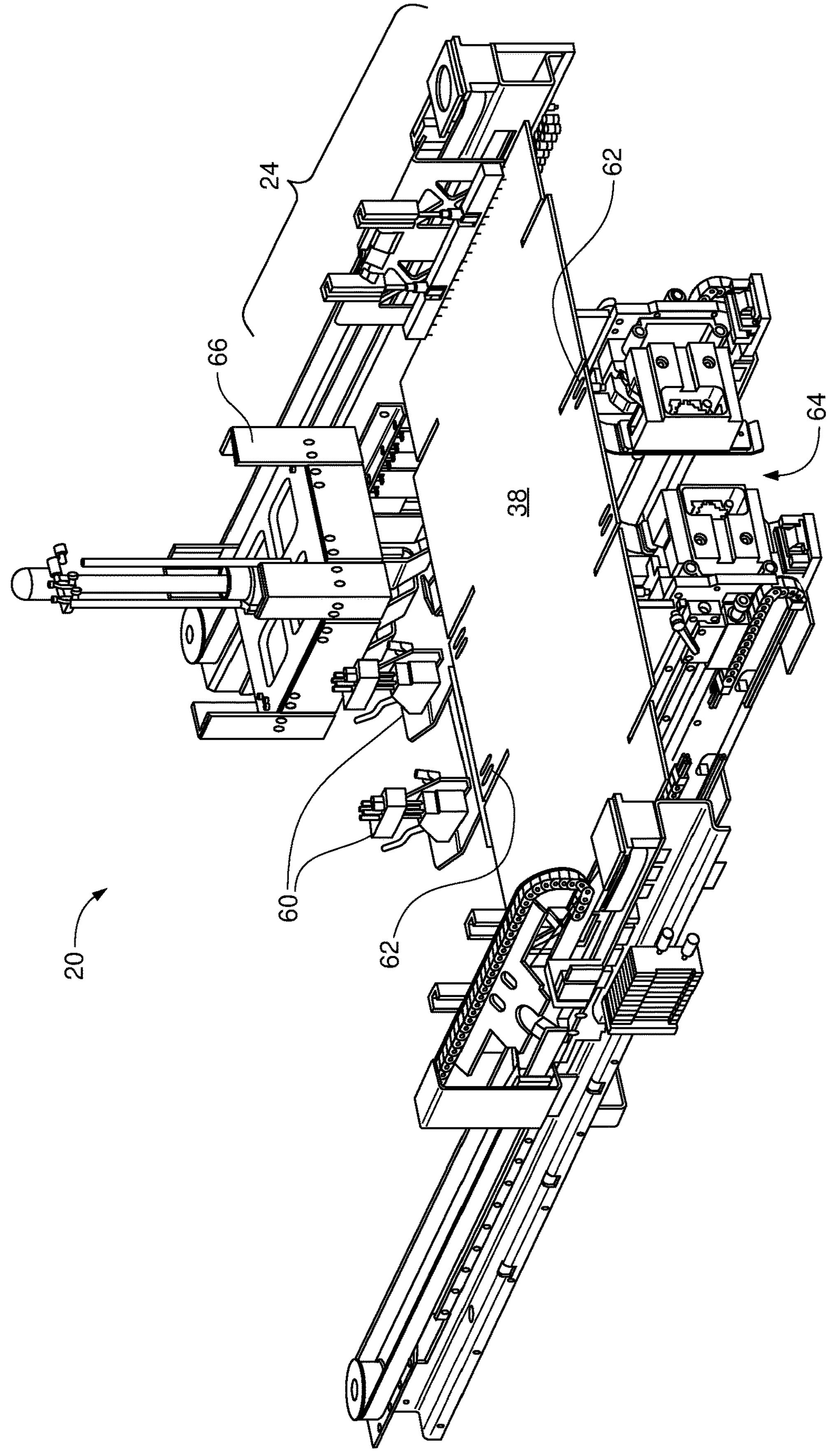
FIGS. 18-21 are a sequence of perspective views of the case forming area of the former shown in FIGS. 1-10, depicting the manner in which the picked blank is engaged by the forming head, and the blank formed into a shipping package or/or retail ready display box.
Figure 19:
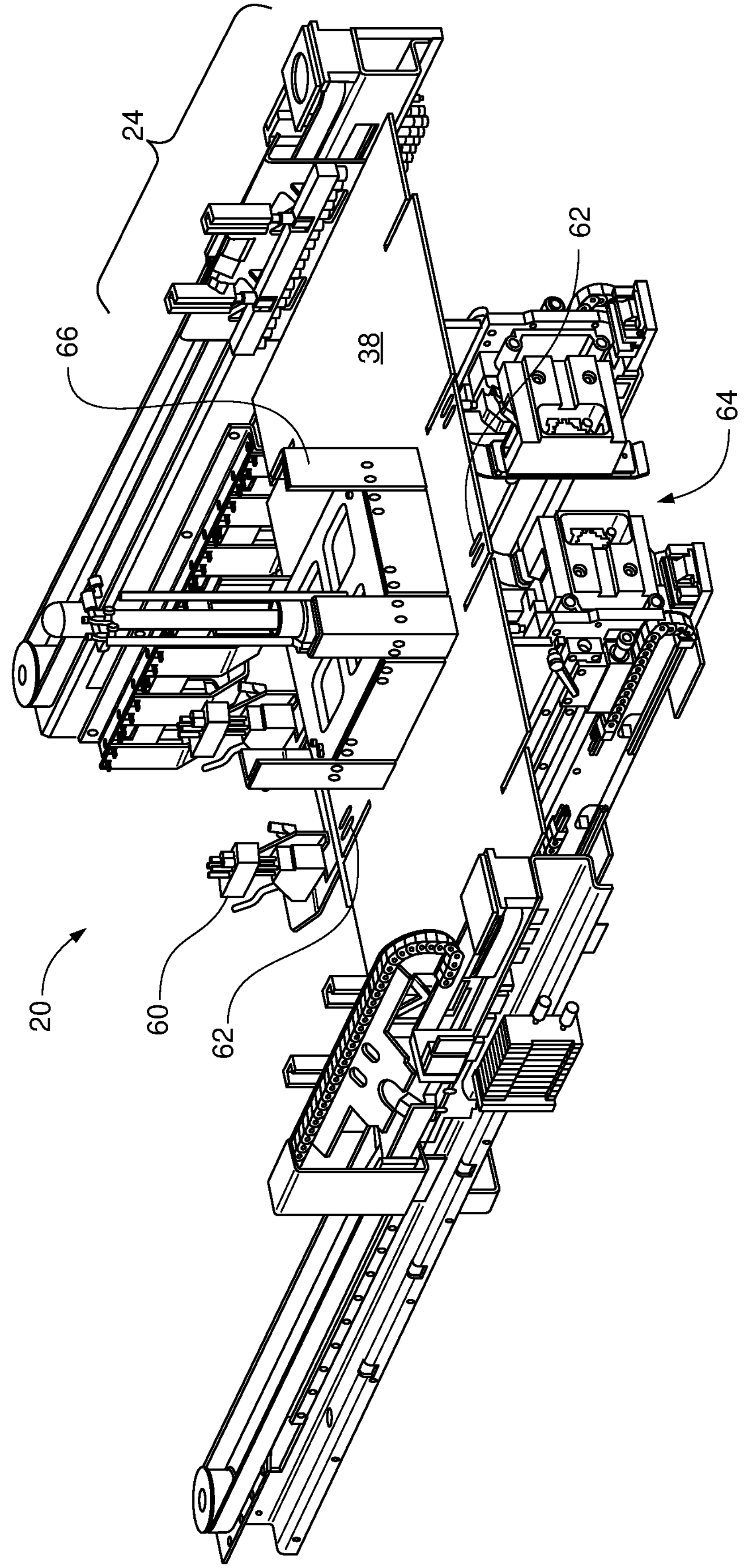
Figure 20:
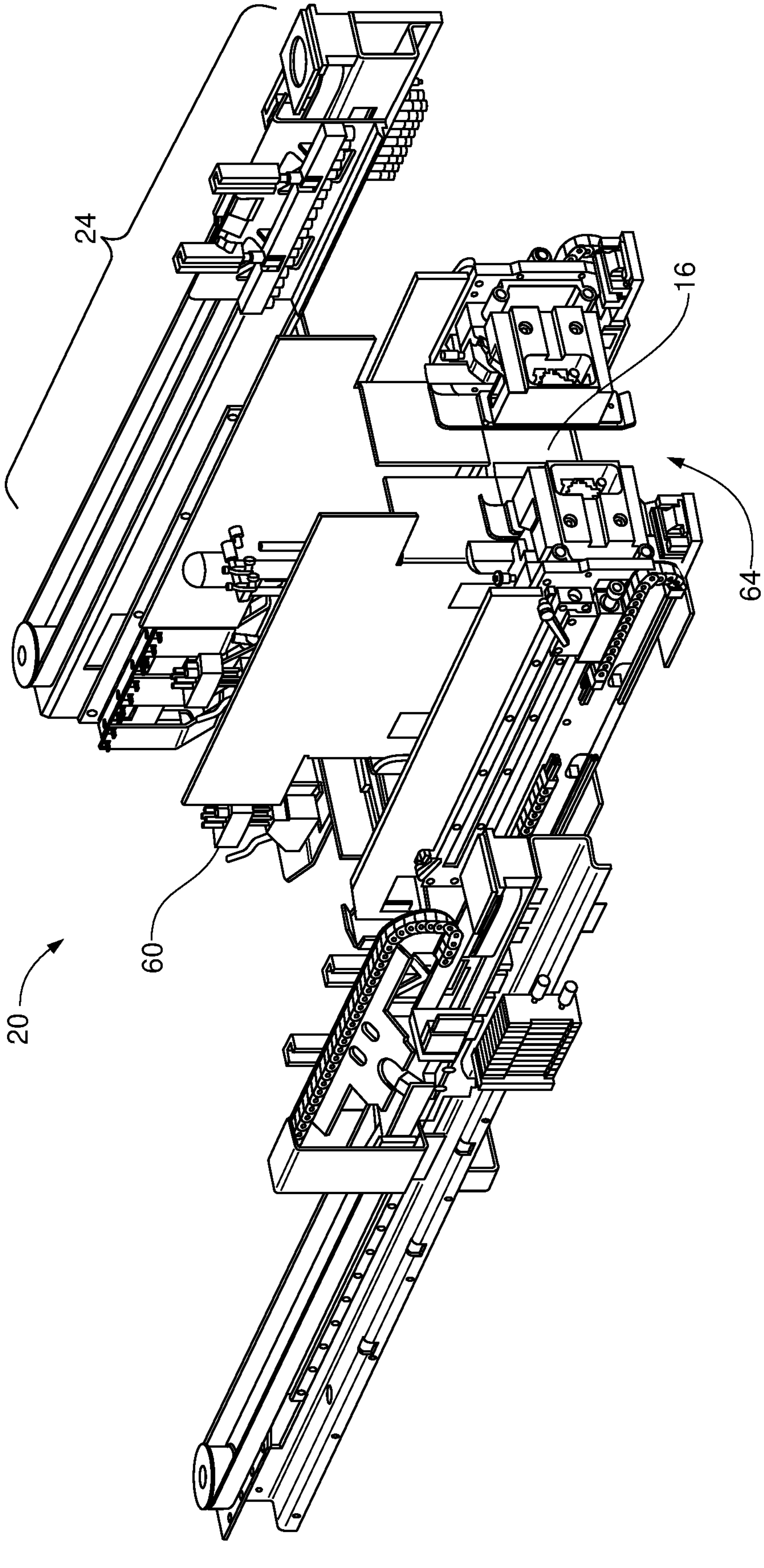
Figure 21:
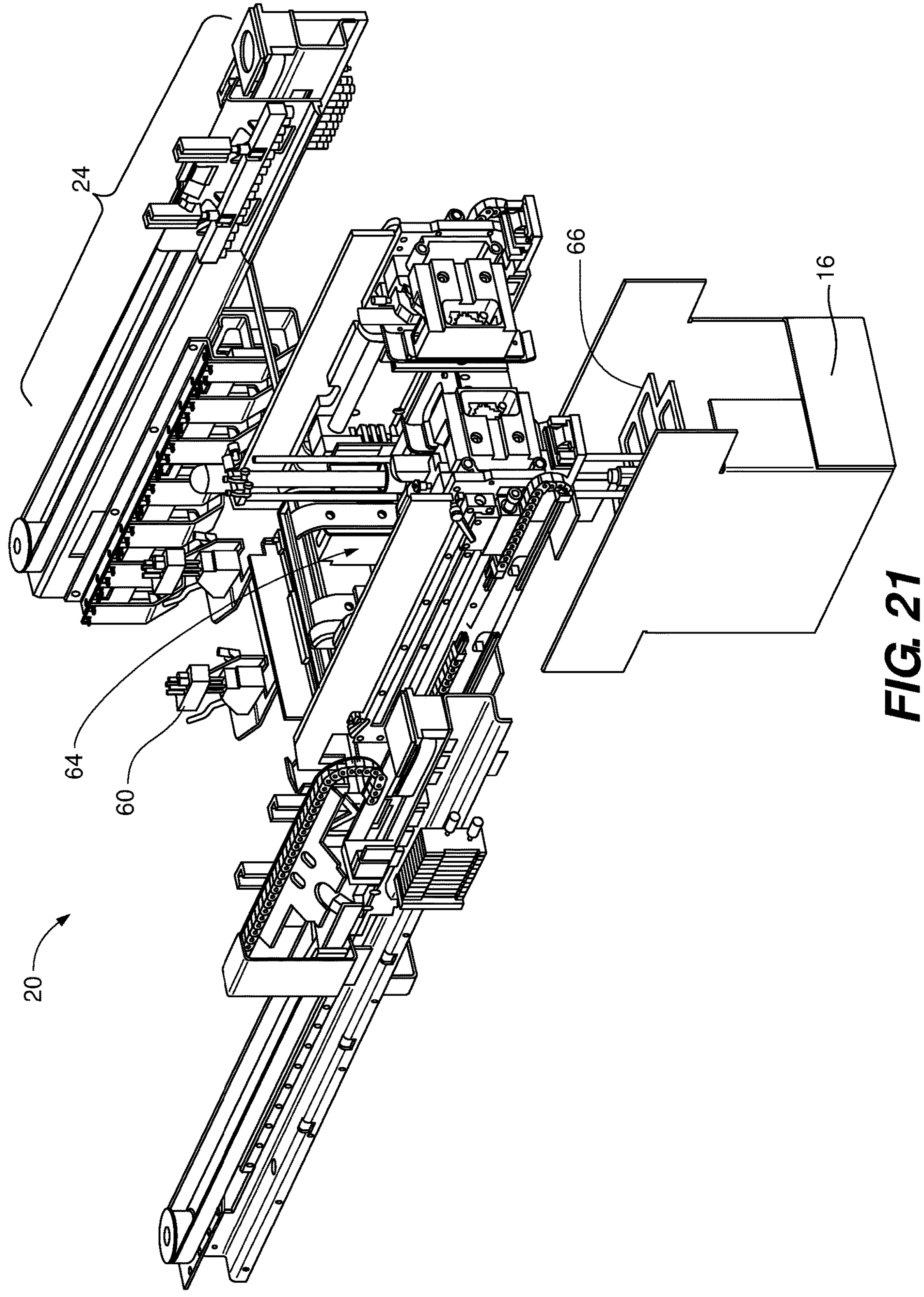

As the picked blank 38 is transported from the case blank area 22 to the case forming area 24, the blank 38 will pass beneath at least one adhesive applicator head 60, such as are shown in FIG. 18, which is/are configured to apply adhesive 62 to one or more locations of the blank 38 as part of the case forming process (i.e., the adhesive depositions 62 are positioned to secure some of the panels of the formed case 16 together after formation) such as is shown in FIGS. 19-21.

Once the picked blank 38 is advanced fully into the case forming area 24, the picked blank 38 will be positioned over a forming cavity 64 (visible in FIGS. 10-12). As shown in FIGS. 18-19, a vertically moveable forming head 66 is positioned over the forming cavity 64. Once the picked blank 38 is positioned over the forming cavity 64, the system 20 will activate the forming head 66 to vertically descend to contact the picked blank 38.

Figure 22:
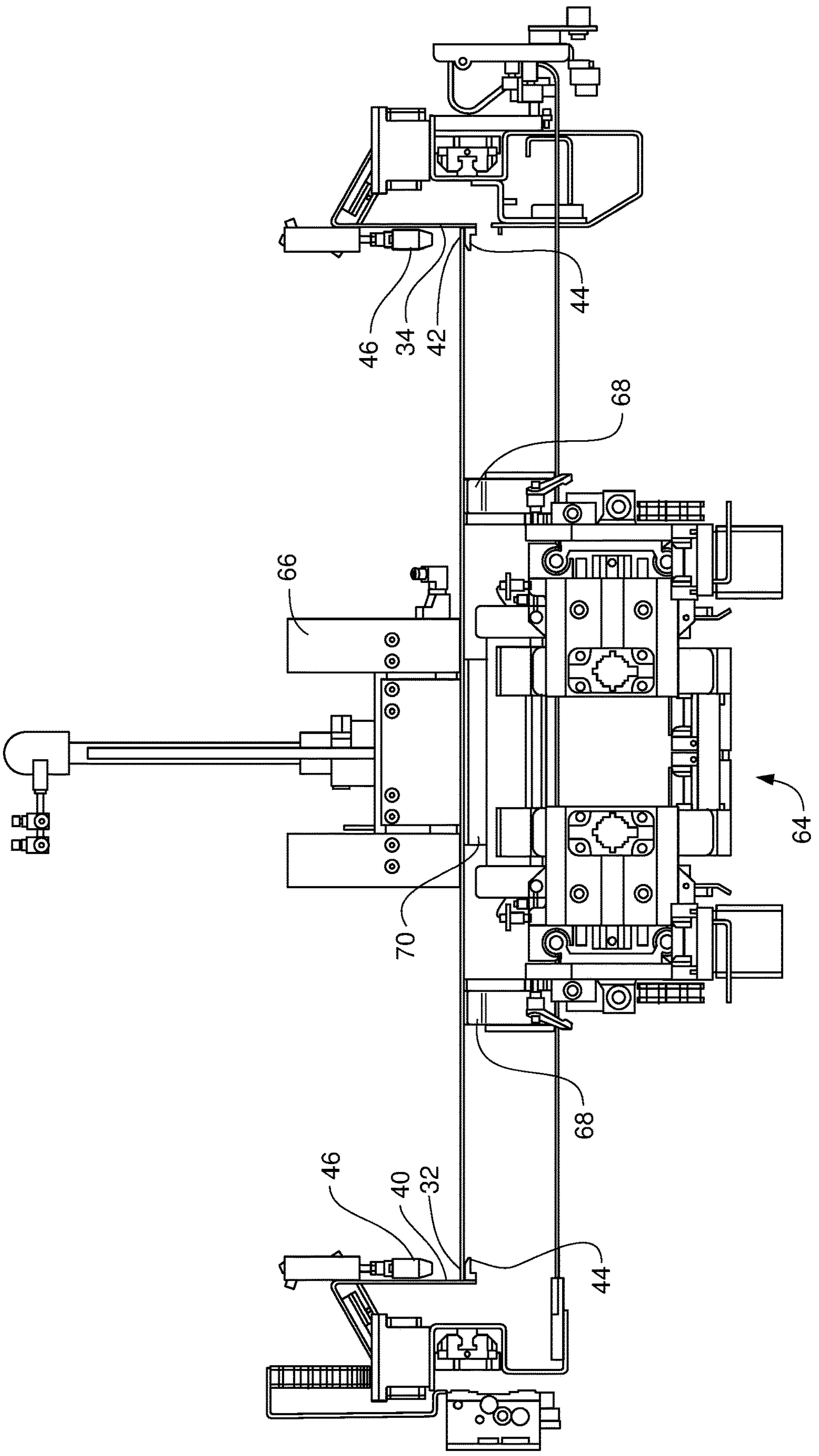
FIGS. 22-23 are front perspective views of the case forming area shown in FIGS. 18-21, depicting the manner in which the shuttle clamps release the picked blank when engaged by the forming head.
Figure 23:
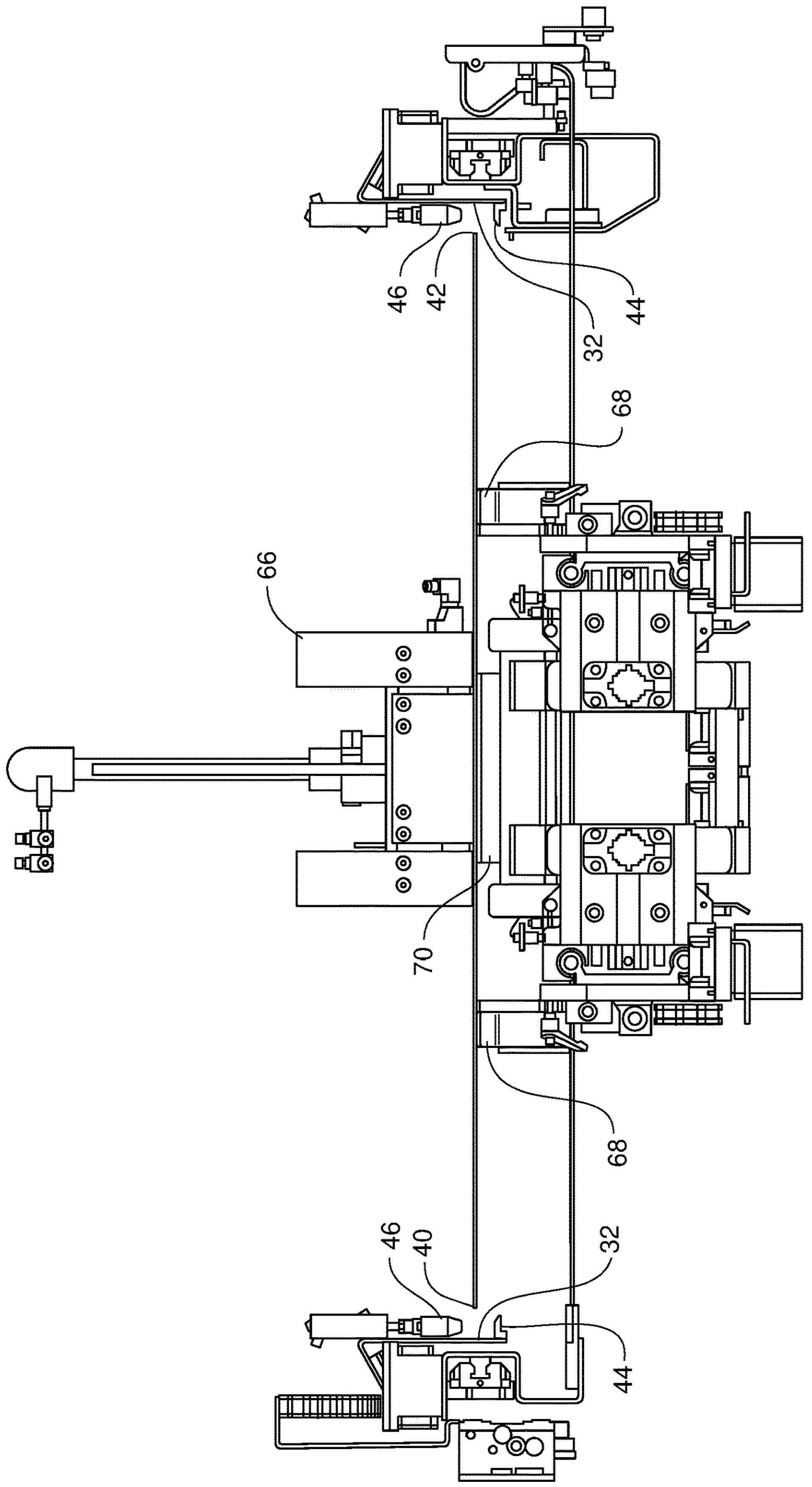

When the forming head 66 comes into to contact with the picked blank 38, in the manner shown in FIG. 19, the shuttle clamp assemblies 32 and 34 release the picked blank 38 in the manner shown in FIGS. 22-23, so that the blank 38 is free to be pushed through the forming cavity 64 by the vertically descending forming head 66 which results in the case blank 38 being folded into a container 16 in the manner shown in FIGS. 20-21.

As is best shown in FIGS. 22-23, the shuttle clamp assemblies 32 and 34 release the picked blank 38 in the reverse of the gripping process described previously above. I.e., each plunger 46 ascends vertically away from the respective edge 40 and 42 of the picked blank 38. Each shuttle clamp assembly 32 and 34 moves laterally away from the picked blank 38 until the shelf 44 of each shuttle clamp assembly 32 and 34 is no longer positioned under an edge 40 and 42 of the picked blank 38, leaving the blank 38 resting on supports 68 and the tooling 70 that defines the forming cavity 64.

Once the picked blank 38 is pushed through the cavity 64 and the container 16 is formed in the manner shown in FIGS. 21-22, the forming head 66 is vertically withdrawn from within the container 16 and is returned to its nominal position above the forming cavity 64 where it remains until a new picked blank is placed into position over the forming cavity, whereupon the container forming process is repeated.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A normalizing system for use with a case former, the normalizing system comprising:

a frame, the frame defining a blank magazine area and a case forming area, the blank magazine area configured to receive a case blank magazine having a plurality of case blanks therein, each of the plurality of case blanks having a right side edge, a left side edge and a leading edge;

a left blank picker and a right blank picker, each blank picker being mounted to the frame and moveable in relation to the frame in a sequence of positions comprising a first position, a second position, a third position, and a fourth position, in the first position each blank picker is positioned a distance vertically above the case blank magazine, in the second position each blank picker is in contact with and engaged to the top-most case blank, in the third position each blank picker is positioned a distance vertically above the blank magazine with the top-most case blank engaged thereto, in the fourth position each blank picker is positioned a distance vertically above the blank magazine with the top-most case blank being released therefrom;

a left shuttle clamp assembly and a right shuttle clamp assembly, each shuttle clamp assembly being mounted to the frame and being independently moveable relative to the frame between the blank magazine area and the case forming area, wherein when the left and right blank pickers are in the third position, the right shuttle clamp assembly engages the right side edge of the top-most case blank and the left shuttle clamp assembly engages the left side edge of the top-most case blank, wherein when the left and right blank pickers are in the fourth position, the right shuttle clamp assembly and the left shuttle clamp assembly are engaged to the top-most case blank, and the right shuttle clamp assembly and the left shuttle clamp assembly move to transport the top-most case blank from the blank magazine area to the case forming area along a linear pathway;

positioned across the linear pathway between the blank magazine area and the case forming area is a left alignment sensor and a right alignment sensor, the left alignment sensor and the right alignment sensor forming a sensor plane therebetween;

wherein the left shuttle clamp assembly and the right shuttle clamp assembly advance along the linear pathway independently at respective first and second predetermined rates determined based on detection of the leading edge by the right and left alignment sensors; and the case forming area defining a forming cavity and having a vertically moveable forming head.

2. The system of claim 1, wherein each of the left shuttle clamp assembly and the right shuttle clamp assembly comprise a shelf and a plunger, when the left blank picker and the right blank picker raise the top-most case blank to the first vertical distance, the left blank picker and the right blank picker release the top-most case blank and the shelf of the left shuttle clamp assembly supports the left edge of the top-most case blank and the shelf of the right shuttle clamp assembly supports the right edge of the top-most case blank.

3. The system of claim 2, wherein the plunger of the left shuttle clamp assembly is moveable between the first position above the shelf and the second position against the left edge of the top-most case blank, and the plunger of the right shuttle clamp assembly is moveable between the first position above the shelf and the second position against the right edge of the top-most case blank.

4. The system of claim 3, further comprising a left servo motor and a right servo motor, the left servo motor in operational communication with the left shuttle clamp assembly, the right servo motor in operational communication with the right shuttle clamp assembly.

5. The system of claim 4, wherein when each plunger is in the second position, the left servo motor advances the left shuttle clamp assembly along the linear pathway at the first predetermined rate and the right servo motor advances the right shuttle clamp assembly along the linear pathway also at the second predetermined rate.

6. The system of claim 5, wherein the leading edge of the top-most case blank extends between the left edge and the right edge, the leading edge having a left portion adjacent to the left edge and a right portion adjacent to the right edge.

7. The system of claim 6, wherein the left portion of the leading edge intersects with the sensor plane and forms a first angle therewith, the right portion of the leading edge intersects with the sensor plane and forms a second angle therewith.

8. The system of claim 7, wherein the system is configured to determine a value of the first angle and the second angle based on a time interval between which the left alignment sensor detects the left portion of the leading edge and the right alignment sensor detects the right portion of the leading edge, the value having an acceptable range and an unacceptable range, wherein when the value is within the unacceptable range, at least one of the left servo and right servo is instructed to change at least one of the first and second predetermined rates.

9. The system of claim 8, wherein the vertically moveable case forming head is moveable between a first position above the case forming cavity to a second position through the case forming cavity.

10. The system of claim 9, further comprising at least one adhesive applicators.

11. The system of claim 10, wherein when the top-most case blank is advanced from the blank magazine area to the case forming area, the at least one adhesive applicator deposits adhesive to at least one location on the top-most case blank.

12. The system of claim 11, wherein the case forming area further comprises at least one support member positioned adjacent to the case forming cavity.

13. The system of claim 12, wherein when the top-most case blank is advanced into the case forming area, the left shuttle clamp assembly and the right shuttle clamp assembly release the top-most case blank and deposit the top-most case blank onto the at least one support member, a portion of the top-most case blank being positioned over the case forming cavity.

14. The system of claim 13, wherein when the top-most case blank is positioned over the case forming cavity, the case forming head moves from the first position above the case forming cavity to the second position thereby pushing the top-most case blank through the case forming cavity to form a case.

15. A normalizing system for use with a case former, the normalizing system comprising:

a frame, the frame defining a blank magazine area and a case forming area, the blank magazine area configured to receive a case blank magazine having a plurality of case blanks therein, each of the plurality of case blanks having a right side edge, a left side edge and a leading edge;

a left blank picker and a right blank picker, each blank picker being mounted to the frame and being vertically moveable toward and away from the case blank magazine in a sequence of positions comprising a first position, a second position, a third position, and a fourth position, in the first position each blank picker is positioned a distance vertically above the case blank magazine, in the second position each blank picker is in contact with and engaged to the top-most case blank, in the third position each blank picker is positioned a distance vertically above the blank magazine with the top-most case blank engaged thereto, in the fourth position each blank picker is positioned a distance vertically above the blank magazine with the top-most case blank being released therefrom;

a left shuttle clamp assembly and a right shuttle clamp assembly, each shuttle clamp assembly being mounted to the frame and being independently moveable relative to the frame between the blank magazine area and the case forming area, wherein when the left and right blank pickers are in the third position, the right shuttle clamp assembly engages the right side edge of the top-most case blank and the left shuttle clamp assembly engages the left side edge of the top-most case blank, wherein when the left and right blank pickers are in the fourth position, the right shuttle clamp assembly and the left shuttle clamp assembly are engaged to the top-most case blank, and the right shuttle clamp assembly and the left shuttle clamp assembly move to transport the top-most case blank from the blank magazine area to the case forming area along a linear pathway;

a right alignment sensor and a left alignment sensor are positioned across the linear pathway, the right alignment sensor and the left alignment sensor forming a sensor plane, the right alignment sensor positioned to form a right side intersection with a right portion of the leading edge, the left alignment sensor positioned to form a left side intersection with a left portion of the leading edge;

the right side intersection forming a first angle defined by the leading edge and the sensor plane, the left side intersection forming a second angle defined by the leading edge and the sensor plane, wherein the system is configured to determine a value of the first angle and the second angle based on detection of the leading edge by the right alignment sensor and the left alignment sensor, the value having an acceptable range and an unacceptable range, wherein when the value is in the acceptable range results in the system determining that the top-most case blank is in proper alignment within the frame and the left shuttle clamp assembly and the right shuttle clamp assembly continue advancing the top-most case blank into the case forming area, wherein when the value is in the unacceptable range results in the system determining that the top-most case blank is in misalignment and signals to at least one of the left shuttle clamp assembly and the right shuttle clamp assembly to alter its speed so as to bring the top-most case blank back into proper alignment.

* * * * *